United States Patent [19]

Alberty et al.

[11] Patent Number: 5,289,503
[45] Date of Patent: Feb. 22, 1994

[54] METHOD AND CIRCUIT ARRANGEMENT FOR PRODUCING A QPSK SIGNAL ON WHICH A CARRIER SIGNAL IS SUPERPOSED

[75] Inventors: Michael Alberty; Wolfgang Steinert, both of Backnang, Fed. Rep. of Germany

[73] Assignee: Ant Nachrichtentechnik GmbH, Backnang, Fed. Rep. of Germany

[21] Appl. No.: 757,303

[22] Filed: Sep. 10, 1991

[30] Foreign Application Priority Data

Sep. 11, 1990 [DE] Fed. Rep. of Germany ....... 4028791

[51] Int. Cl.$^5$ ............................................. H04L 27/18
[52] U.S. Cl. ....................................... 375/67; 375/54; 332/104
[58] Field of Search ................. 375/52, 54, 67, 53, 375/83; 332/103, 104, 144; 455/110

[56] References Cited

U.S. PATENT DOCUMENTS

| 3,978,406 | 8/1976 | Matsumoto et al. |
| 4,267,591 | 5/1981 | Wissel et al. ............................ 375/54 |
| 4,940,954 | 7/1990 | Aubert et al. ............................ 375/67 |
| 4,999,590 | 3/1991 | Verdot ...................................... 375/67 |

FOREIGN PATENT DOCUMENTS

| 0422417A2 | 9/1990 | European Pat. Off. |
| 2154306 | 5/1973 | France . |
| 7601836 | 8/1977 | France . |
| 1293723 | 11/1991 | Japan . |

OTHER PUBLICATIONS

"High data rate Solid-state millimeter-wave transmitter module" Jun. 1975, published by IEEE New York, pp. 470-477.
Poppe, "Double Phase-Shift Keying Speeds Data Over Voice Channels", *Electronics,* Oct. 1966, pp. 91-96.
Patent Abstracts of Japan, vol. 14, No. 82 (E-889) Feb. 15, 1989.
"Tracking and Data Relay Satellite System (TDRSS) Users' Guide", Revision 5, Sep. 1984, published by National Aeronautic and Space Administration, Goddard Space Flight Center.

*Primary Examiner*—Curtis Kuntz
*Assistant Examiner*—T. Ghebretinsae
*Attorney, Agent, or Firm*—Spencer, Frank & Schneider

[57] ABSTRACT

A method of generating a composite signal in the form of a QPSK signal on which an additional carrier signal is superposed, wherein a carrier signal is conducted through two series connected, switchable phase shifters. One of the phase shifters is controlled by one of two data signals. Both data signals are logically linked with one another by a logic circuit, and the resulting linkage signal used to control the other phase shifter. The phase states into which each phase shifter can be switched are selected and the linkage signal formed from the data signals such that, with the available values of the data signals, the carrier signal passing through the phase shifters is brought into the phase positions that should exist with the additional carrier signal superposed.

17 Claims, 1 Drawing Sheet

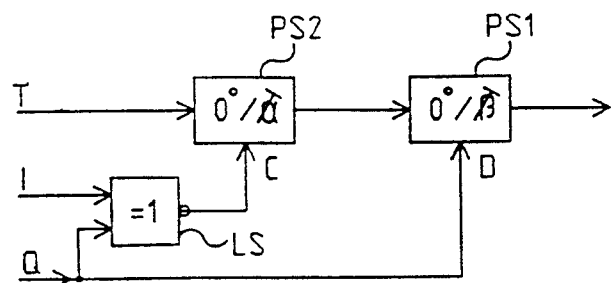
Fig. 1
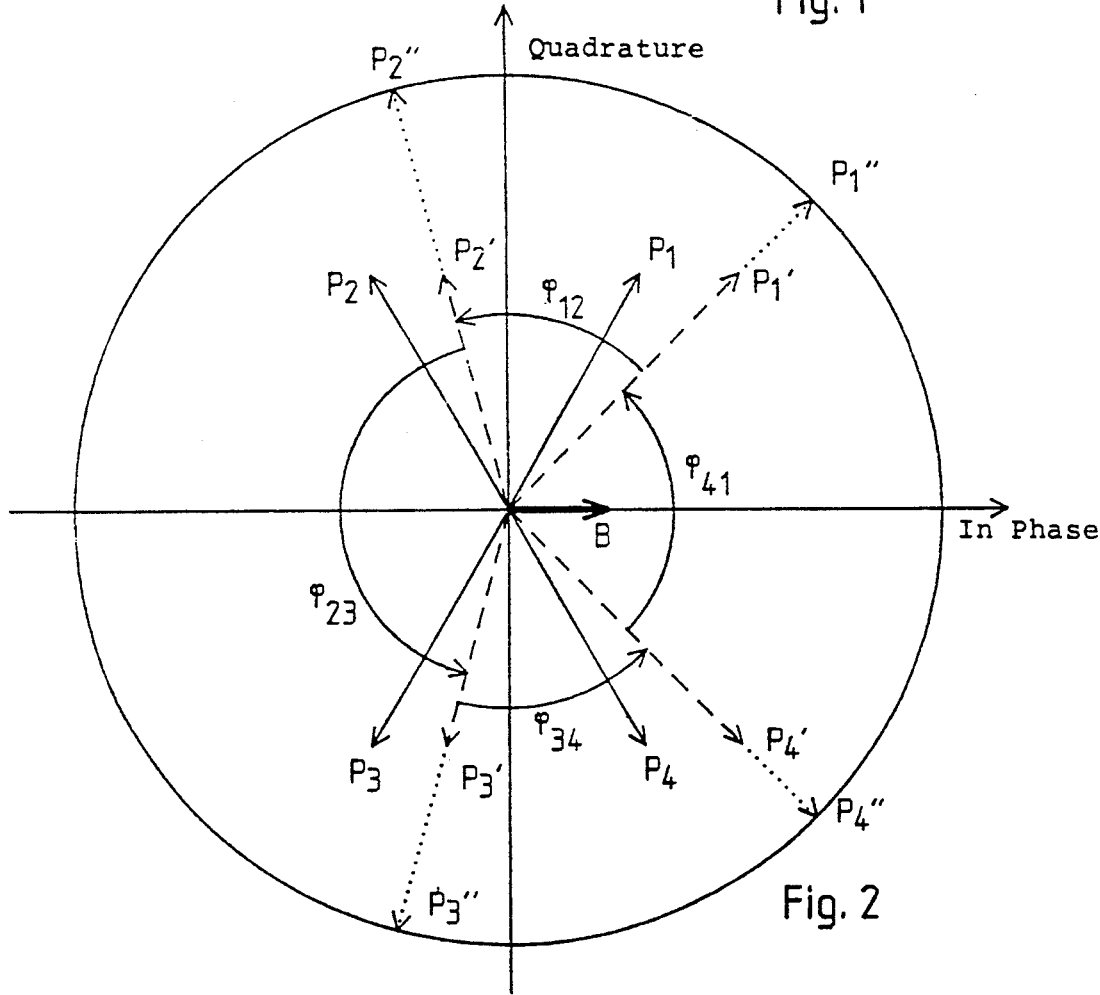
Fig. 2
| Phase State | I | Q | C | D |
|---|---|---|---|---|
| $P_1''$ | 0 | 0 | 0 | 0 |
| $P_2''$ | 1 | 0 | 1 | 0 |
| $P_3''$ | 1 | 1 | 0 | 1 |
| $P_4''$ | 0 | 1 | 1 | 1 |
Fig. 3

METHOD AND CIRCUIT ARRANGEMENT FOR PRODUCING A QPSK SIGNAL ON WHICH A CARRIER SIGNAL IS SUPERPOSED

CROSS-REFERENCE TO RELATED APPLICATION

This application claims the priority of Federal Republic of Germany Application Ser. No. P 4028791.2 filed Sep. 11, 1990, which is incorporated herein by reference.

BACKGROUND OF THE INVENTION

The present invention relates to a method of producing a quaternary phase shift keyed (QPSK) signal on which an additional carrier signal is superposed. The carrier signal superposed on the QPSK signal may, for example, have the function of a beacon signal which is utilized for antenna follow-up at the receiving end of a data transmission path.

SUMMARY OF THE INVENTION

It is an object of the present invention to provide a method of the above-mentioned type which permits the generation of a QPSK signal on which an additional carrier signal is superposed with very low expenditures for circuitry.

This is accomplished according to the invention by generating a QPSK signal on which an additional carrier signal is superposed, wherein a carrier signal is conducted through two series connected, switchable phase shifters, one of the two switchable phase shifters is controlled by one of two data signals, both data signals are logically linked with one another, and the other switchable phase shifter is controlled by a control signal resulting from the linkage. The phase shift states into which each of the phase shifters can be switched are selected in such a way and the control signal resulting from the linkage of the two data signal is formed so that, with the available values of the two data signals, the carrier signal passing through the two phase shifters can be brought into the phase positions that would be present with the additional carrier signal superposed.

The method can be implemented with only two phase shifters and a logic circuit. Advantageous arrangements for implementing the method include two switchable phase shifters, each of which can be switched between a 0° phase shift state and one other phase shift state ($\alpha$, $\beta$), wherein one of the two data signals serves as the control signal for one of the two phase shifters and the linkage signal controls the other switchable phase shifter. The two data signals are preferably linked with one another bit-by-bit in an EXOR circuit and its output used to control one of the switchable phase shifters so that if the control signal output by the EXOR circuit is a logic "0", the phase shifter takes on the 0° phase shift state and if the control signal output by the EXOR circuit is a logic "1" the phase shifter takes on the other phase shift state ($\alpha$). If the data signal controlling the other phase shifter is a logic "0", the other phase shifter takes on the 0° phase shift state and if the data signal is a logic "1", said other phase shifter takes on the other phase shift state ($\beta$).

BRIEF DESCRIPTION OF THE DRAWINGS

These and other features and advantages of the invention will be further understood from the following detailed description of the preferred embodiments with reference to the accompanying drawings in which:

FIG. 1 shows a circuit arrangement for generating a QPSK signal with a superposed carrier according to the invention;

FIG. 2 shows a phase plane with four signal states; and

FIG. 3 is a truth table for the logic circuit according to the invention.

DESCRIPTION OF THE PREFERRED EMBODIMENT

In the circuit arrangement shown in FIG. 1, the total power of a carrier signal T is conducted through two series connected switchable phase shifters PS1 and PS2. One of the two phase shifters can be keyed between a 0° phase shift state and a phase shift state $\beta$ and the other phase shifter PS2 can be keyed between the 0° phase shift state and a phase shift state $\alpha$. Each one of the two phase shifters PS1 and PS2 has a control input which receives a respective control signal D,C. These two control signals C and D are derived for the in-phase and the quadrature phase component, respectively, from data signals I and Q. In the illustrated embodiment, the data signal Q is employed as the control signal D for the phase shifter PS1 which has the phase shift states of 0° and $\beta$. The control signal C for the other phase shifter PS2, that can be switched into the 0° and $\alpha$ phase shift states, is derived from the logic linkage of the two data signals I and Q in a logic circuit LS provided for this purpose. Which type of logic circuit LS is to be employed depends upon the bit combinations of the data signals I and Q in the control signal C resulting from the linkage that are to switch the phase shifter PS2 into the one or the other phase shift state.

The formation of a QPSK signal on which an additional carrier signal—hereinafter called the beacon signal—is superposed will be described with reference to the phase plane shown in FIG. 2. The solid lines in the phase plane are vectors which show the phase constellation of a QPSK signal (without a further data signal) and its four signal states (phase states and amplitude states) $P_1$, $P_2$, $P_3$ and $P_4$. This example relates to a so-called unbalanced QPSK or UQPSK signal whose in-phase and quadrature phase components have different amplitudes. However, the amplitudes of the in-phase components for the four signal states $P_1$, $P_2$, $P_3$ and $P_4$ are equal to each other and the amplitudes of the quadrature components for the four signal states $P_1$, $P_2$, $P_3$ and $P_4$ are equal to each other so that the four vectors representing the states are, in adjacent pairs on opposite sides of the inphase and quadrature axes, symmetrical with respect to those axes. If now a beacon signal B is superposed on this QPSK signal, all signal states $P_1$, $P_2$, $P_3$ and $P_4$ shift in the direction toward and by the amplitude of the beacon signal B. The resulting new phase constellation with its new (adjusted) signal states $P_1'$, $P_2'$, $P_3'$ and $P_4'$ is shown in dashed lines in the phase plane. In the illustrated example, the beacon signal B is oriented in the direction of the positive abscissa (inphase axis) of the phase plane. However, the phase position of the beacon signal B may also be rotated by $n \cdot 90°$ ($n=0$, 1, 2).

It must be noted that the superposition of a beacon signal—namely as a function of its phase position and amplitude—changes the phase angles between the individual signal states compared to the original QPSK signal (without beacon signal). Conversely, this means that a certain selection of the phase angles $\phi_{12}$, $\phi_{23}$, $\phi_{34}$ and $\phi_{41}$ between the signal states $P_1'$, $P_2'$, $P_3'$ and $P_4'$ has the same effect as the superposition of a beacon signal B of a certain amplitude and phase position on a QPSK signal.

As can be seen in FIG. 2, the signal states $P_1'$, $P_2'$, $P_3'$ and $P_4'$ created by the superposition of the beacon signal B initially have different amplitudes. However, in many applications in practice the thus produced signal is still raised to the necessary transmitting level with the aid of an amplifier. Due to the more favorable power consumption, this amplifier is preferably operated in saturation which results in the different amplitudes being matched. Thus, the signal states $P_1''$, $P_2''$, $P_3''$ and $P_4''$ result at the output of the transmitting amplifier due to corresponding shifts (dotted lines) of the signal states $P_1'$, $P_2'$, $P_3'$ and $P_4'$. However, the matching of the amplitude differences may also take place in the modulator. This makes possible the realization of the modulator at very little expense for circuitry. Moreover, the solution described below avoids phase errors that are created by AM/PM conversion when the transmitting amplifier is operated with input signals at different amplitudes.

The signal states $P_1''$, $P_2''$, $P_3''$ and with $P_4''$ with the same amplitudes and the phase angles $\phi_{12}$, $\phi_{23}$, $\phi_{34}$ and $\phi_{41}$ between the individual signal states are generated in the following manner by the circuit shown in FIG. 1. (Since the amplitudes of signal states $P_1''$, $P_2''$, $P_3''$ and $P_4''$ are all the same, these signal states will hereinafter be identified as adjusted phase states.) Adjusted phase state $P_1''$ in the phase plane is here assumed to be associated with a carrier signal T that is not shifted in phase by the two phase shifters PS1 and PS2. In this case, both phase shifters PS1 and PS2 are switched to a same phase shift state $\delta$, in this example the 0° phase shift state. It is assumed, for example, that the two phase shifters PS1 and PS2 each take on their $\delta$ or 0° phase shift state if the applied control signal D or C, respectively, is a logic "0". Thus, the circuit furnishes the adjusted phase state marked $P_1''$ in the phase plane if both control signals C and D are logic "0". If the phase shifter PS2 now receives a control signal C which is a logic "1", it switches to phase shift state $\alpha = \phi_{12}$ and if the phase shifter PS1 retains its 0° phase shift state (D=0), the adjusted phase state $P_2''$ is obtained, that is, the carrier signal T is shifted in phase by an angle $\alpha = \phi_{12}$. In the phase plane this appears in such a way that the vector representing the original carrier signal, which starts at the origin of the phase plane and ends at point $P_1''$, is shifted by an angle $\alpha = \phi_{12}$. If the control signal C is a logic "0" and the control signal D a logic "1", the phase shifter PS2 takes on the 0° phase shift state and the phase shifter PS1 takes on the phase shift state $\beta = \phi_{12} + \phi_{23}$. The carrier signal conducted through the two phase shifters PS1 and PS2 is thus shifted in phase by the angle $\phi_{12} + \phi_{23}$. With this phase shift, the original adjusted phase state $P_1''$ is now changed to the adjusted phase state $P_3''$. If both control signals C and D are at logic "1", the phase shifter PS2 switches into the phase shift state $\alpha = \phi_{12}$ and the phase shifter PS1 shifts to phase shift state $\beta = \phi_{12} + \phi_{23}$. Thus, the carrier signal T as a whole is shifted in phase by $2\cdot\phi_{12} + \phi_{23}$ where $\phi_{12} = \phi_{34}$). This results in the adjusted phase state $P_4''$.

The truth table of FIG. 3 shows a possible association between the data signals I and Q and the control signals C and D for phase shifters PS1 and PS2. It is assumed here that the data signal Q is employed as the control signal D for phase shifter PS1. Linkage of the two data signals I and Q in an anti-valence circuit (EXOR) LS produces the individual bit combinations of data signals I and Q for the bit values for the control signal C shown in the Table of FIG. 3.

The invention now being fully described, it will be apparent to one of ordinary skill in the art that any changes and modifications can be made thereto without departing from the spirit or scope of the invention as set forth herein.

What is claimed is:

1. A method of generating a composite signal including a QPSK signal having four possible phase-states on which a beacon signal is superposed so that the composite signal has four predetermined possible adjusted phase states, comprising the steps of passing a carrier signal through two series connected switchable phase shifters, each phase shifter having two available phase shift states;

generating a first control signal by logically linking two data signals, each of which have one of two corresponding values;

applying the first control signal to a first one of the two shifters to select the phase shift state thereof as between the two available phase shift states thereof, whereby the carrier signal is phase shifted by a first angle corresponding to a first selected phase shift state; and applying one of the data signals as a second control signal to a second one of the two shifters to select the phase shift state thereof as between the two available phase shift states thereof, whereby the carrier signal is phase shifted by a second angle corresponding to a second selected phase shift state; and wherein the two available phase shift states of each of the two phase shifters and the logical linking for generating the first control signal from the two data signals are selected so that the carrier signal, after passing through the two shifters, has the predetermined four possible adjusted phase states and therefore forms the composite signal.

2. A method of generating a composite signal in the form of a quaternary phase shift keyed (QPSK) signal having first, second, third and fourth predetermined phase states on which a beacon signal is superposed, the composite signal having first, second, third and fourth adjusted phase states respectively corresponding to the first, second, third and fourth phase predetermined states of the phase shift keyed signal, the method comprising the steps of:

applying a first data signal, serving as a first control signal, to a control port of a first switchable phase shifter having two phase shift states, the first data signal having two available values which are effective respectively to select different ones of said phase shift states;

logically linking the first data signal with a second data signal having two available values to obtain a second control signal, first, second, third and fourth different combinations of one of the two available values of the first data signal with one of the two available values of the second data signal corresponding respectively with the first, second, third and fourth predetermined phase states, the second control signal having two available values which depend on the two available values of the first data signal and the two available values of the second data signal;

applying the second control signal to a control port of a second switchable phase shifter which is series connected to the first shifter, the second shifter having two phase shift states, each of the two available values of the second control signal being effective to select a different one of the two phase shift states of the second shifter; and passing a carrier signal in succession through the first and second shifters; and wherein the selected phase shift states and the logical linking to form the second control signal from the two data signals being such that, for the first and second data signals having the first, second, third and fourth combinations of available values, the carrier signal passing through the two phase shifters has its phase shifted respectively to the first, second, third and fourth adjusted phase states, thereby to form the composite signal.

3. A method as defined in claim 2, wherein the first, second, third and fourth predetermined phase states can be represented respectively as first, second, third and fourth vectors in the phase plane respectively in the first, second, third and fourth quadrants such that as pairs of vectors, the first and second vectors are symmetrically disposed with respect to the quadrature axis, the third and fourth vectors are symmetrically disposed with respect to the quadrature axis, the first and fourth vectors are symmetrically disposed with respect to the inphase axis, and the second and third vectors are symmetrically disposed with respect toe the inphase axis;

the beacon signal is represented in the phase plane by a vector in the direction of the inphase axis or shifted by an integer multiple of 90° with respect thereto; and, the first, second, third and fourth adjusted phase states and be represented in the phase plane as first, second, third and fourth adjusted vectors corresponding respectively to said first, second, third and fourth vectors which are phase shifted in the direction toward the vector for the beacon signal.

4. A method as defined in claim 3, wherein a first one of the two phase shift states of each of the first and second shifters is 0°, a second one of the two phase shift states of the first shifter is equal to the angle separating the first adjusted vector and the second adjusted vector and a second one of the two phase shift states of the second shifter is equal to the angle separating the first adjusted vector and the third adjusted vector.

5. A method as defined in claim 2, wherein a first one of the two phase shift states of each of the first and second shifters are a same angle $\delta$, a second one of the two phase shift states of the first shifter is equal to an angle $\alpha$ other than $\delta$, and a second one of the two phase shift states of the second shifter is equal to an angle $\beta$ other than $\delta 0$ and $\alpha$.

6. A method as defined in claim 5, wherein the angle $\delta$ is 0°.

7. A method as defined in claim 6, wherein:

said step of linking comprises the step of linking the two data signals with one another bit-by-bit in an anti-valence circuit;

said step of applying the second control signal includes the step of adopting the 0° phase shift state in the second shifter if the second control signal is a logic "0" and includes the step of adopting the phase shift state $\beta$ if the second control signal is a logic "1"; and said step of applying the first control signal includes the step of adopting the 0° phase shift state in the first shifter if the first control signal is a logic "0" and includes the step of adopting the phase shift state $\alpha$ if the first control signal is a logic "1∞.

8. A method as defined in claim 5 wherein said angle $\alpha$ is equal to the angle between the first and second adjusted phase states and said angle $\beta$ is equal to the angle between said first and third adjusted phase states.

9. A circuit arrangement for generating a composite signal including a QPSK signal having four possible phase states, on which a beacon signal is superposed so that the composite signal has four predetermined possible adjusted phase states, comprising:

means for logically linking two data signals, each of which data signals have one of two corresponding values, to provide a first control signal; and first and second series connected switchable phase shifters, each phase shifter having a control port and two available phase shift states, the control port of the first shifter being connected for receiving the first control signal, the first control signal controlling the phase shift state of the first shifter, the control port of the second shifter being connected for receiving one of the two data signals as a second control signal, the second control signal controlling the phase shift state of the second phase shifter; and wherein:

the available phase shift states of each of the two phase shifters and the linking means generating the first control signal from the two data signals are such that a carrier signal, after passing through the two shifters, has the predetermined four possible adjusted phase states and therefore forms the composite signal.

10. A circuit arrangement as defined in claim 9, wherein the two phase shift states of each of the first and second shifters includes a 0°0 phase shift state and a nonzero phase shift state.

11. A circuit arrangement as defined in claim 10, wherein:

said linking means comprises an anti-valence circuit which links the first and second data signals with one another bit-by-bit;

said first shifter shifts the carrier signal by 0° if the first control signal is a logic "0" and shifts the carrier signal by a first nonzero phase shift if the first control signal is a logic "1"; and said second shifter shifts the carrier signal by 0° if the second control signal is a logic "0" and shifts the carrier signal by a second nonzero phase shift if the second control signal is a logic "1".

12. A circuit arrangement for generating a composite signal in the form of a quaternary phase shift keyed (QPSK) signal having first, second, third and fourth predetermined phase states on which a beacon signal having a first carrier phase is superposed, the composite signal having first, second, third and fourth adjusted phase states respectively corresponding to the first, second, third and fourth phase states of the phase shift keyed signal, the arrangement comprising:

linking means for logically linking first and second data signals, the first data signal having one of two available values, the second data signal having one of two available values, each of the first, second, third and fourth adjusted phase states respectively corresponding to a different first, second, third and fourth combination of one of the two available values of the first data signal and one of the two available values of the second data signal, the linking means providing in response to the first and second data signals a first control signal having one of two available values; and first and second switchable phase shifters, the first shifter having a control input connected to receive the first control signal and having means for shifting a phase of a carrier signal by a first angle if the first control signal has a first one of its two available values and shifting the phase of the carrier by a second angle if the first control signal has a second one of its two available values, the second shifter having a control input connected to receive the first data signal as a second control signal and having means for shifting the phase of the carrier signal by a third angle if the second control signal has a first one of its two available values and shifting the phase of the carrier signal by a fourth angle if the second control signal has a second one of its two available values, the first and second shifters being connected in series;

the first, second, third and fourth angles being such that and the linking means linking the first and second data signals so that, for the first and second data signals having each of the first, second, third or fourth combinations of available values, the carrier signal passing through the two phase shifters has its phase shifted respectively to the first, second, third and fourth adjusted phase state, thereby to form the composite signal.

13. A circuit arrangement as defined in claim 12, wherein the first, second, third and fourth predetermined phase states can be represented respectively as third, second, third and fourth vectors in the phase plane, respectively in the first, second, third and fourth quadrants, such that as pairs of vectors, the first and second vectors are symmetrically disposed with respect to the quadrature axis, the third and fourth vectors are symmetrically disposed with respect toe the quadrature axis, the first and fourth vectors are symmetrically disposed with respect to the inphase axis, and the second and third vectors symmetrically disposed with respect to the inphase axis;

the beacon signal is represented in the phase plane by a vector in the direction of the inphase axis or shifted by an integer multiple of 90° with respect thereto; and, the first, second, third and fourth adjusted phase states can be represented in the phase plane as first, second, third and fourth adjusted vectors corresponding respectively to said first, second, third and fourth vectors which are phase shifted in the direction toward the vector for the beacon signal.

14. A circuit arrangement as defined in claim 13, wherein the first and third angles are 0°, the second angle is equal to the angle separating the first adjusted vector and the second adjusted vector and the fourth angle is equal to the angle separating the first adjusted vector and the third adjusted vector.

15. A circuit arrangement as defined in claim 12, wherein the first and third angles are equal to each other and the second and fourth angles are different from the first and third angles and from each other.

16. A circuit arrangement as defined in claim 12, wherein the first and third angles are each 0°.

17. A circuit arrangement as defined in claim 16, wherein:

said linking means comprises an anti-valence circuit which links the first and second data signals with one another bit-by-bit;

said first shifter shifts the carrier signal by 0° if the first control signal is a logic "0" and shifts the carrier signal by the second angle if the first control signal is a logic "1"; and said second shifter shifts the carrier signal by 0° if the second control signal is a logic "0" and shifts the carrier signal by the fourth angle if the second control signal is a logic "1".

* * * * *